Patented June 22, 1948

2,443,835

UNITED STATES PATENT OFFICE 2,443,835

STABILIZATION OF MERCAPTANS

Charles J. Pedersen, Penns Grove, N. J., assignor to E. I. du Pont de Nemours & Company, Wilmington, Del., a corporation of Delaware No Drawing. Application December 14, 1944, Serial No. 568,214

14 Claims. (Cl. 260—609)

This invention relates to the stabilization of mercaptans and particularly to inhibiting the oxidation of mercaptans in the presence of iron and its catalytically active compounds.

In general, mercaptans are susceptible to oxidation by the oxygen of the air during manufacture and storage, whereby they are oxidized to the corresponding disulfides. This oxidation is catalyzed by iron, manganese and copper and many of their compounds. The catalysis of such oxidation by iron is particularly unfortunate since most production equipment and storage vessels are made of ferrous metals, whereby the mercaptans are frequently exposed to contamination by iron.

It is an object of my invention to stabilize mercaptans against oxidation during manufacture and storage. Another object is to stabilize mercaptans against oxidation, particularly when such mercaptans contain or are in contact with iron or its catalytically active compounds. A further object is to provide novel stabilizers for mercaptans. Other objects are to provide new compositions of matter. Still other objects will appear hereinafter.

The above and other objects may be accomplished in accordance with my invention which comprises incorporating in a mercaptan, normally subject to oxidation by the oxygen of the air, a small proportion, sufficient to inhibit such oxidation, of an organic compound containing a radical of an oxygen acid of phosphorus having at least one unreplaced acid hydrogen atom. I have found that such phosphorus compounds are very effective to stabilize the mercaptans against oxidation, particularly when the mercaptan contains or is in contact with iron or a catalytically active compound of iron. These phosphorus compounds also very substantially reduce the corrosive action of the mercaptans on ferrous metals.

A mercaptan, as employed herein, will be understood to mean an organic compound containing an —SH group with the sulfur directly bonded to carbon. The mercaptan may be an open chain aliphatic mercaptan, a cyclo-aliphatic mercaptan, an aromatic mercaptan (a thiophenol) or a heterocyclic mercaptan. The mercaptan may contain non-hydrocarbon groups, such as hydroxyl, ether, thioether, carboxylic ester, carboxylic amide, thiazyl, thiazolinyl and like groups. However, my invention is particularly applicable to mercaptans which, except for the —SH group, consist of carbon and hydrogen and especially to the aliphatic mercaptans which may be acyclic or alicyclic.

I have found that organic compounds containing a radical of an oxygen acid of phosphorus, having at least one unreplaced acid hydrogen atom, are, as a class, effective to materially inhibit oxidation of such mercaptans. Such phosphorus compounds may be represented by the formula

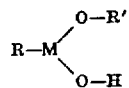

wherein R represents an aliphatic, aromatic, aliphatic oxy or aromatic oxy radical; R' represents hydrogen or an aliphatic or aromatic radical; M represents P or P=O. Representative types of compounds within this class are:

Organic phosphonic acids
Organic phosphinic acids
Organic acid-esters of phosphoric acids
Organic acid-esters of phosphorous acid
Organic acid-esters of phosphonic acids I particularly prefer the organic acid-esters of the oxygen acids of phosphorus and especially of phosphoric acid. Also, I generally prefer that the organic group, attached to the radical of the acid of phosphorus, be an aliphatic radical and especially a long chain alkyl radical. By long chain, I mean a chain of at least 8 carbon atoms. The most desirable and effective of the phosphorus compounds is the mixture designated as "Lorol" phosphate. This is a mixture of mono- and di-esters derived from "Lorol" alcohol. "Lorol" alcohol is a commercial mixture of normal straight-chain alcohols, consisting primarily of n-octyl and n-decyl alcohols, and is obtained by the fractionation of the mixtures of alcohols resulting from the reduction of cocoanut or palm kernel oils.

The phosphorus compounds or stabilizers may be employed within a wide range of concentrations generally of from about 0.001% to about 1%, but preferably will be employed in the proportion of from about 0.005% to about 0.1% based on the mercaptan. The stabilizers may be added directly to the mercaptan or dissolved in a suitable solvent. They may be added to the mercaptan at any suitable step in its process of manufacture.

The relative oxidation stability of the thiol compounds, or mercaptans, was determined by two different experimental methods: (1) oxygen absorption at room temperature, and (2) accelerated aging at 66±1° C.

The equipment for the first method consisted of an upright stoppered distilling flask (340 cc. capacity) connected to a 780 mm. vertical glass tube which dipped into a reservoir of mercury. The flask was flushed with commercial oxygen for 5 minutes, charged with the sample (50 cc.)

by means of a long-legged dropping funnel and stoppered. The flask was immersed in a water bath maintained at room temperature. The rate of oxygen absorption was determined by periodically noting the rise of mercury in the vertical tube.

The results obtained by this method will be presented first. The term "Lorol" is used to denote a commercial alkyl mixture consisting mostly of n-octyl, n-C$_8$H$_{17}$—, and n-decyl, n-C$_{10}$H$_{21}$—, radicals. Hence "Lorol" mercaptan is a mixture comprising n-octyl and n-decyl mercaptans. The results obtained with "Lorol" mercaptan are shown in Table I.

TABLE I

Oxygen absorption by "Lorol" mercaptan

| No. | Additive | Conc. Wt. Percent | Relative Rate of O$_2$ Absorption |
|---|---|---|---|
| 1 | None (blank) | | 100 |
| 2 | Stearamidomethane phosphonic acid | 0.01 | 23 |
| 3 | Iron as ferric oleate | 0.004 | 1,240 |

It will be observed that the rate of oxidation of "Lorol" mercaptan is greatly increased by soluble iron and retarded by the phosphonic acid.

The results obtained with pinene mercaptan are given in Table II.

TABLE II

Oxygen absorption by pinene mercaptan

| No. | Additive | Conc. Wt. Percent | Relative Rate of O$_2$ Absorption |
|---|---|---|---|
| 1 | None (blank) | | 100 |
| 2 | "Lorol" phosphate | 0.1 | 40 |
| 3 | Iron as ferric oleate | 0.004 | 1,600 |
| 4 | {Iron as ferric oleate / "Lorol" phosphate} | 0.004 / 0.1 | 0 |

It will be noted that the oxidation of pinene mercaptan is accelerated by iron and retarded by "Lorol" phosphate, which is a mixture comprising mono- and di-(n-octyl) phosphates and mono- and d-(n-decyl) phosphates. "Lorol" phosphate is capable of suppressing the catalytic activity of iron.

The results obtained with alpha- and beta-thionaphthols, which are substantially in agreement with the results already presented, are shown in Tables III and IV.

TABLE III

Oxygen absorption by alpha-thionaphthol

| No. | Additive | Conc. Wt. Percent | Relative Rate of O$_2$ Absorption |
|---|---|---|---|
| 1 | None (blank) | | 100 |
| 2 | "Lorol" phosphate | 0.1 | 83 |
| 3 | Iron as ferric oleate | 0.004 | 3,320 |
| 4 | {Iron as ferric oleate / "Lorol" phosphate} | 0.004 / 0.1 | 108 |

TABLE IV

Oxygen absorption by beta-thionaphthol

| No. | Additive | Conc. Wt. Percent | Relative Rate of O$_2$ Absorption |
|---|---|---|---|
| 1 | None (blank) | | 100 |
| 2 | "Lorol" phosphate | 0.1 | 85 |
| 3 | Iron as ferric oleate | 0.004 | 1,240 |
| 4 | {Iron as ferric oleate / "Lorol" phosphate} | 0.004 / 0.1 | 122 |

The oxidation stability and the stabilization of "Lorol" mercaptan were tested more extensively by an accelerated test. This method consisted in exposing 50 cc. of mercaptan in a 100 cc. unstoppered glass bottle to the air in a constant temperature oven maintained at 66±1° C. Small samples were taken out periodically and their purity determined iodometrically. The results obtained by this method are given in the following tables.

TABLE V

Air oxidation of "Lorol" mercaptan at 66±1° C.

| No. | Additive | Conc. Wt. Percent | Percent Loss in Purity After Days | | | |
|---|---|---|---|---|---|---|
| | | | 0 | 7 | 18 | 34 |
| 1 | None (blank) | | 0.0 | 5.5 | 7.1 | 8.3 |
| 2 | Dibutyl phosphite | 0.01 | 0.0 | 0.6 | 1.0 | 2.1 |
| 3 | Benzene phosphonic acid | 0.01 | 0.0 | 0.0 | 0.9 | 1.9 |

It will be noted that dibutyl phosphite and benzene phosphonic acid retard the oxidation of "Lorol" mercaptan. The inhibition due to these compounds during 34 days of exposure was 74.7 and 77.1%, respectively.

TABLE VI

Air oxidation of "Lorol" mercaptan at 66±1° C.

| No. | Additive | Conc. Wt. Percent | Percent Loss in Purity After Days | | | |
|---|---|---|---|---|---|---|
| | | | 0 | 2 | 13 | 29 |
| 1 | None (blank) | | 0.0 | 1.0 | 5.7 | 6.3 |
| 2 | "Lorol" phosphate | 0.01 | 0.0 | 0.0 | 0.4 | 0.7 |

The stabilizing effect of "Lorol" phosphate is high, the inhibition being 89% during 29 days of exposure.

The corrosive action of mercaptans and thiophenols on metals, particularly ferrous metals, can be reduced by the addition of the phosphorus derivatives of this invention.

Corrosion of iron was determined by immersing at room temperature 16 gauge black iron strips in 127 grams of "Lorol" mercaptan contained in 250 cc. widemouth bottles open to the air. The test strips were cleaned with steel wool, rinsed with acetone and dried.

The results obtained are given in Table VII.

TABLE VII

Corrosion of black iron in "Lorol" mercaptan at room temperature

| No. | Treatment | Conc. Wt. Percent | Corrosion, mg. loss per sq. in. per 200 hrs. | Appearance of the Iron |
|---|---|---|---|---|
| 1 | None (blank) | | 0.42 | Clean but not shiny. |
| 2 | "Lorol" phosphate | 0.01 | 0.27 | Clean and shiny. |

At the end of the corrosion tests the samples of mercaptan were analyzed for purity and exposed to air at 66±1° C. for 6 days. After this period they were analyzed again and the percent loss in purity calculated. The results are shown in the following table.

TABLE VIII

*Air oxidation of "Lorol" mercaptan*

| No. | Treatment | Conc. Wt. Per cent | Percent loss in purity | |
|---|---|---|---|---|
| | | | During corrosion test | After exposure at 66±1° C. |
| 1 | None (blank) | | 2.2 | 9.5 |
| 2 | "Lorol" phosphate | 0.01 | 0.0 | 1.2 |

It will be observed that "Lorol" phosphate not only decreases the corrosion of iron in "Lorol" mercaptan, but greatly increases the oxidation stability of the mercaptan. As far as the loss of metal is concerned, the corrosion of iron in "Lorol" mercaptan at room temperature is relatively slight. The advantages gained by the use of the phosphate are the better appearance of the metal, and a diminished tendency of the mercaptan to oxidize and darken in contact with iron.

The stabilizers belonging to this class can be prepared by the various well known methods disclosed in the literature. "Lorol" phosphate, for example is prepared by reacting "Lorol" alcohol with phosphous pentoxide at about 50–60° C.

Besides many others the following compounds are stabilizers of mercaptans:

Monolauryl phosphite
Monobutyl-mono-octyl phosphite
Monophenyl phosphate
Dilauryl phosphate
Monobutyl-monodecyl phosphate
Lecithin
Cephalin
Phytic acid
Benzene phosphinic acid
2-hydroxy-2-propane phosphonic acid
12-hydroxy-12-tricosane phosphonic acid
Benzamidomethane phosphonic acid Besides many others, the following mercaptans can be stabilized by means of the phosphorus compounds of this invention.

Propyl mercaptan
Butyl mercaptan
Amyl mercaptan
Hexyl mercaptan
Heptyl mercaptan
Octyl mercaptan
Decyl mercaptan
Dodecyl mercaptan
Monothiopropylene glycol
Propanedithiol-1,2
2-ethylhexyl thioglycolate
Dibutylamide of thioglycolic acid
Pentadecanedithiol-7,8
Decane dithiol-1,10
Monoethyl ether of ethanedithiol
Pinene mercaptan
Thioterpineol
Thioterpinol
Thioborneol
Cyclohexyl mercaptan
Benzyl mercaptan
Thiophenol
Thiocresol
Dithioresorcinol
2-methyl-5-isopropylthiophenol
Alpha-thionaphthol
Beta-thionaphthol
2-mercaptobenzothiazole
2-mercaptothiazoline and mixtures of these and other mercaptans.

By the practice of the present invention, mercaptans of greatly increased oxidation stability are obtained. These stabilized products are less corrosive to metals, such as iron, and retain their purity and initial color for a much longer time.

It will be understood that many variations and modifications can be made without departing from the spirit or scope of my invention. For example, other mercaptans may be effectively stabilized and other phosphorus compounds of the class herein disclosed may be substituted for those specifically mentioned. Accordingly, my invention is not to be limited to the specific embodiments disclosed, but I intend to cover my invention broadly as in the appended claims.

I claim:

1. A composition of matter comprising a mercaptan, normally subject to oxidation by the oxygen of the air, and from about 0.001% to about 1% of an alkyl acid-ester of an oxygen acid of phosphorus.

2. A composition of matter comprising a mercaptan, normally subject to oxidation by the oxygen of the air, and from about 0.001% to about 1% of an alkyl acid-ester of phosphoric acid.

3. A composition of matter comprising a mercaptan, normally subject to oxidation by the oxygen of the air, and from about 0.001% to about 1% of a long chain alkyl acid-ester of phosphoric acid.

4. A composition of matter comprising a mercaptan, normally subject to oxidation by the oxygen of the air, and from about 0.001% to about 1% of a mixture of alkyl acid-esters of phosphoric acid comprising mono-(n-octyl) phosphate, di-(n-octyl) phosphate, mono-(n-decyl) phosphate and di-(n-decyl) hosphate.

5. A composition of matter comprising a mercaptan, which, except for the —SH group, consists of carbon and hydrogen and which is normally subject to catalytic oxidation caused by a member of the group consisting of iron and its compounds, and from about 0.001% to about 1% of an organic acid-ester of an oxygen acid of phosphorus in which the organic group consists of carbon and hydrogen.

6. A composition of matter comprising a mercaptan, which, except for the —SH group, consists of carbon and hydrogen and which is normally subject to catalytic oxidation caused by a member of the group consisting of iron and its compounds, and from about 0.001% to about 1% of an organic acid-ester of phosphoric acid in which the organic group consists of carbon and hydrogen.

7. A composition of matter comprising a mercaptan, which, except for the —SH group, consists of carbon and hydrogen and which is normally subject to catalytic oxidation caused by a member of the group consisting of iron and its compounds, and from about 0.001% to about 1% of a long chain alkyl acid-ester of phosphoric acid.

8. A composition of matter comprising a mercaptan, which, except for the —SH group, consists of carbon and hydrogen and which is normally subject to catalytic oxidation caused by a member of the group consisting of iron and its compounds, and from about 0.001% to about 1% of a mixture of alkyl acid-esters of phosphoric acid comprisng mono-(n-octyl) phosphate, di-(n-octyl) phosphate, mono-(n-decyl) phosphate and di-(n-decyl) phosphate.

9. A composition of matter comprising an aliphatic mercaptan, which, except for the —SH group, consists of carbon and hydrogen and which is normally subject to oxidation by the oxygen of the air, and from about 0.001% to about 1% of a long chain alkyl acid-ester of phosphoric acid.

10. A composition of matter comprising a mixture of mercaptans comprising n-octyl mercaptan and n-decyl mercaptan, normally subject to oxidation by the oxygen of the air, and from about 0.001% to about 1% of an organic acid-ester of an oxygen acid of phosphorus in which the organic group consists of carbon and hydrogen.

11. A composition of matter comprising a mixture of mercaptans comprising n-octyl mercaptan and n-decyl mercaptan, normally subject to oxidation by the oxygen of the air, and from about 0.001% to about 1% of a mixture of alkyl acid-esters of phosphoric acid comprising mono-(n-octyl) phosphate, di-(n-octyl) phosphate, mono-(n-decyl) phosphate and di-(n-decyl) phosphate.

12. A composition of matter comprising a mercaptan, normally subject to oxidation by the oxygen of the air, and from about 0.001% to about 1% of a member of the class consisting of alkyl acid-esters of phosphoric acid, cycloalkyl acid-esters of phosphoric acid, monocyclic-aryl acid-esters of phosphoric acid, alkyl acid-esters of phosphorous acid, hydroxy-alkyl phosphonic acid, monocyclic-aryl phosphonic acid, monocyclic-arylamidoalkyl phosphonic acid, alkylamidoalkyl phosphonic acid, monocyclicaryl phosphinic acid, lecithin and cephalin.

13. A composition of matter comprising a mercaptan, which, except for the —SH group, consists of carbon and hydrogen and which is normally subject to catalytic oxidation caused by a member of the group consisting of iron and its compounds, and from about 0.001% to about 1% of a member of the class consisting of alkyl acid-esters of phosphoric acid, cycloalkyl acid-esters of phosphoric acid, monocyclic-aryl acid-esters of phosphoric acid, alkyl acid-esters of phosphorous acid, hydroxy-alkyl phosphonic acid, monocyclic-aryl phosphonic acid, monocyclic-arylamidoalkyl phosphonic acid, alkylamidoalkyl phosphonic acid, monocyclic-aryl phosphinic acid, lecithin and cephalin.

14. A composition of matter comprising a mixture of mercaptans comprising n-octyl mercaptan and n-decyl mercaptan, normally subject to oxidation by the oxygen of the air, and from about 0.001% to about 1% of a member of the class consisting of alkyl acid-esters of phosphoric acid, cycloalkyl acid-esters of phosphoric acid, monocyclic-aryl acid-esters of phosphoric acid, alkyl acid-esters of phosphorous acid, hydroxy-alkyl phosphonic acid, monocyclic-aryl phosphonic acid, monocyclic-arylamidoalkyl phosphonic acid, alkylamidoalkyl phosphonic acid, monocyclic-aryl phosphinic acid, lecithin and cephalin.

CHARLES J. PEDERSEN.

REFERENCES CITED

The following references are of record in the file of this patent:

UNITED STATES PATENTS

| Number | Name | Date |
|---|---|---|
| 1,593,232 | Whitworth | July 20, 1926 |
| 1,812,839 | Derby | June 30, 1931 |
| 2,005,619 | Graves | June 18, 1935 |
| 2,052,210 | Borglin | Aug. 25, 1936 |
| 2,346,102 | Simo | Apr. 4, 1944 |

Certificate of Correction

Patent No. 2,443,835.    June 22, 1948.

CHARLES J. PEDERSEN

It is hereby certified that errors appear in the printed specification of the above numbered patent requiring correction as follows: Column 3, line 46, for "d-(n-decyl)" read *di-(n-decyl)*; column 5, line 27, for "phosphous" read *phosphorus*; column 6, line 37, claim 4, for "hosphate" read *phosphate*; and that the said Letters Patent should be read with these corrections therein that the same may conform to the record of the case in the Patent Office.

Signed and sealed this 14th day of September, A. D. 1948.

[SEAL]

THOMAS F. MURPHY,
*Assistant Commissioner of Patents.* the air, and from about 0.001% to about 1% of a long chain alkyl acid-ester of phosphoric acid.

10. A composition of matter comprising a mixture of mercaptans comprising n-octyl mercaptan and n-decyl mercaptan, normally subject to oxidation by the oxygen of the air, and from about 0.001% to about 1% of an organic acid-ester of an oxygen acid of phosphorus in which the organic group consists of carbon and hydrogen.

11. A composition of matter comprising a mixture of mercaptans comprising n-octyl mercaptan and n-decyl mercaptan, normally subject to oxidation by the oxygen of the air, and from about 0.001% to about 1% of a mixture of alkyl acid-esters of phosphoric acid comprising mono-(n-octyl) phosphate, di-(n-octyl) phosphate, mono-(n-decyl) phosphate and di-(n-decyl) phosphate.

12. A composition of matter comprising a mercaptan, normally subject to oxidation by the oxygen of the air, and from about 0.001% to about 1% of a member of the class consisting of alkyl acid-esters of phosphoric acid, cycloalkyl acid-esters of phosphoric acid, monocyclic-aryl acid-esters of phosphoric acid, alkyl acid-esters of phosphorous acid, hydroxy-alkyl phosphonic acid, monocyclic-aryl phosphonic acid, monocyclic-arylamidoalkyl phosphonic acid, alkylamidoalkyl phosphonic acid, monocyclicaryl phosphinic acid, lecithin and cephalin.

13. A composition of matter comprising a mercaptan, which, except for the —SH group, consists of carbon and hydrogen and which is normally subject to catalytic oxidation caused by a member of the group consisting of iron and its compounds, and from about 0.001% to about 1% of a member of the class consisting of alkyl acid-esters of phosphoric acid, cycloalkyl acid-esters of phosphoric acid, monocyclic-aryl acid-esters of phosphoric acid, alkyl acid-esters of phosphorous acid, hydroxy-alkyl phosphonic acid, monocyclic-aryl phosphonic acid, monocyclic-arylamidoalkyl phosphonic acid, alkylamidoalkyl phosphonic acid, monocyclic-aryl phosphinic acid, lecithin and cephalin.

14. A composition of matter comprising a mixture of mercaptans comprising n-octyl mercaptan and n-decyl mercaptan, normally subject to oxidation by the oxygen of the air, and from about 0.001% to about 1% of a member of the class consisting of alkyl acid-esters of phosphoric acid, cycloalkyl acid-esters of phosphoric acid, monocyclic-aryl acid-esters of phosphoric acid, alkyl acid-esters of phosphorous acid, hydroxy-alkyl phosphonic acid, monocyclic-aryl phosphonic acid, monocyclic-arylamidoalkyl phosphonic acid, alkylamidoalkyl phosphonic acid, monocyclic-aryl phosphinic acid, lecithin and cephalin.

CHARLES J. PEDERSEN.

REFERENCES CITED

The following references are of record in the file of this patent:

UNITED STATES PATENTS

| Number | Name | Date |
|---|---|---|
| 1,593,232 | Whitworth | July 20, 1926 |
| 1,812,839 | Derby | June 30, 1931 |
| 2,005,619 | Graves | June 18, 1935 |
| 2,052,210 | Borglin | Aug. 25, 1936 |
| 2,346,102 | Simo | Apr. 4, 1944 |

---

Certificate of Correction

Patent No. 2,443,835.          June 22, 1948.

CHARLES J. PEDERSEN

It is hereby certified that errors appear in the printed specification of the above numbered patent requiring correction as follows: Column 3, line 46, for "d-(n-decyl)" read *di-(n-decyl)*; column 5, line 27, for "phosphous" read *phosphorus*; column 6, line 37, claim 4, for "hosphate" read *phosphate*; and that the said Letters Patent should be read with these corrections therein that the same may conform to the record of the case in the Patent Office.

Signed and sealed this 14th day of September, A. D. 1948.

[SEAL]

THOMAS F. MURPHY,
*Assistant Commissioner of Patents.*